United States Patent
Shahana et al.

(10) Patent No.: US 10,000,255 B2
(45) Date of Patent: Jun. 19, 2018

(54) BICYCLE DRIVE UNIT AND BICYCLE EQUIPPED WITH THE DRIVE UNIT

(71) Applicant: Shimano Inc., Sakai, Osaka (JP)

(72) Inventors: Satoshi Shahana, Osaka (JP); Tomohisa Yamamoto, Osaka (JP); Hiroyuki Urabe, Osaka (JP); Yusuke Nishikawa, Osaka (JP)

(73) Assignee: Shimano Inc., Osaka (JP)

( * ) Notice: Subject to any disclaimer, the term of this patent is extended or adjusted under 35 U.S.C. 154(b) by 223 days.

(21) Appl. No.: 15/057,984

(22) Filed: Mar. 1, 2016

(65) Prior Publication Data

US 2016/0288872 A1    Oct. 6, 2016

(30) Foreign Application Priority Data

Mar. 31, 2015    (JP) .................. 2015-073398

(51) Int. Cl.

| | |
|---|---|
| *F16H 3/72* | (2006.01) |
| *B62M 6/55* | (2010.01) |
| *B62K 25/28* | (2006.01) |
| *B62M 11/14* | (2006.01) |
| *F16H 1/28* | (2006.01) |

(52) U.S. Cl.
CPC .......... *B62M 6/55* (2013.01); *B62K 25/286* (2013.01); *B62M 11/145* (2013.01); *F16H 3/72* (2013.01); *F16H 1/28* (2013.01)

(58) Field of Classification Search
None
See application file for complete search history.

(56) References Cited

U.S. PATENT DOCUMENTS

| | | |
|---|---|---|
| 5,758,736 A | 6/1998 | Yamauchi |
| 2014/0051548 A1 | 2/2014 | Hino et al. |
| 2016/0339992 A1* | 11/2016 | Yoshiie .................. B62M 6/45 |

FOREIGN PATENT DOCUMENTS

| | | |
|---|---|---|
| EP | 2685604 A1 | 1/2014 |
| JP | H08-72781 A | 3/1996 |
| JP | 8-295284 A | 11/1996 |
| JP | 11-240481 A | 9/1999 |
| JP | 3081960 U | 11/2001 |

(Continued)

OTHER PUBLICATIONS

Notification of Reasons for Refusal of corresponding Japanese Application No. 2015-073398 dated Jan. 9, 2018.

*Primary Examiner* — Justin Holmes
(74) *Attorney, Agent, or Firm* — Global IP Counselors, LLP

(57) ABSTRACT

A bicycle drive unit is basically provided with an assist motor and a housing such that the distance between a crankshaft and a rear end of the housing is prevented from becoming long. The assist motor is configured to apply an assisting force to a manual drive force, which is inputted from a crankshaft. The housing is provided to the assist motor and at least a part of the crankshaft. The housing is disposed around the crankshaft. The housing is formed so that, when the bicycle drive unit is attached to a bicycle frame, the minimum distance from a center axis of the crankshaft and the rear end surface of the frame on the rear end side of the housing is equal to or less than 50 mm and greater than the radius of the crankshaft, as viewed from parallel to the center axis of the crankshaft.

18 Claims, 6 Drawing Sheets

(56) References Cited

FOREIGN PATENT DOCUMENTS

| | | |
|---|---|---|
| JP | 3095432 U | 7/2003 |
| JP | 2012-532789 A | 12/2012 |
| JP | 5373946 B1 | 12/2013 |
| WO | 2011/004988 A2 | 1/2011 |

* cited by examiner

BICYCLE DRIVE UNIT AND BICYCLE EQUIPPED WITH THE DRIVE UNIT

CROSS-REFERENCE TO RELATED APPLICATIONS

This application claims priority to Japanese Patent Application No. 2015-073398, filed on Mar. 31, 2015. The entire disclosure of Japanese Patent Application No. 2015-073398 is hereby incorporated herein by reference.

BACKGROUND

Field of the Invention

The present invention generally relates to a bicycle drive unit and a bicycle equipped with the drive unit.

Background Information

A bicycle drive unit which is attached around a crankshaft is known (for example, Japanese Utility Model Registration No. 3081960).

SUMMARY

If a drive unit is attached around a crankshaft, then the distance from the crankshaft to the rear end becomes long and the operability of the bicycle declines as compared to a normal bicycle which is not equipped with a drive unit.

One object of the present invention is to provide a bicycle drive unit which can prevent the distance between the crankshaft and the rear end from becoming long, and a bicycle which is equipped with this drive unit.

In view of the state of the known technology and in accordance with a first aspect of the present disclosure, a bicycle drive unit is provided that basically comprises an assist motor and a housing. The assist motor is configured to apply an assisting force to a manual drive force, which is inputted from a crankshaft. The housing is at least partially disposed around the assist motor and at least a part of the crankshaft. The housing is configured so that, when the bicycle drive unit is attached to a bicycle frame, a minimum distance from a center axis of the crankshaft and a rear end surface of the frame on a rear end side of the housing is equal to or less than 50 mm and greater than a radius of the crankshaft, when viewed from a direction that is parallel to the center axis of the crankshaft.

In accordance with a second aspect of the present invention, the bicycle drive unit according to the first aspect is configured so that the rear end surface of the housing includes a portion whose distance to the center axis of the crankshaft is equal to or less than 50 mm and greater than the radius of the crankshaft over a prescribed range around the crankshaft, when viewed from a direction that is parallel to the center axis of the crankshaft.

In accordance with a third aspect of the present invention, the bicycle drive unit according to the first aspect is configured so that the minimum distance is equal to or less than 45 mm.

In accordance with a fourth aspect of the present invention, the bicycle drive unit according to the first aspect is configured so that the rear end surface of the housing includes a portion whose distance to the center axis of the crankshaft is constant over a prescribed range around the crankshaft, when viewed from a direction that is parallel to the center axis of the crankshaft.

In accordance with a fifth aspect of the present invention, a bicycle drive unit is provided that basically comprises an assist motor and a housing. The assist motor is configured to apply an assisting force to a manual drive force, which is inputted from a crankshaft. The housing is at least partially disposed around the assist motor and at least a part of the crankshaft. The housing is at least partially disposed around the crankshaft. The housing is configured so that, when the bicycle drive unit is attached to a bicycle frame, a rear end side of the housing includes a portion whose distance to a center axis of the crankshaft is constant over a prescribed range around the crankshaft configured so that, when the bicycle drive unit is attached to a bicycle frame, a rear end side of the housing includes.

In accordance with a sixth aspect of the present invention, the bicycle drive unit according to the first aspect is configured so that the distance is equal to or less than 45 mm.

In accordance with a seventh aspect of the present invention, the bicycle drive unit according to the first aspect is configured so that the crankshaft is disposed near one end of the housing with respect to a longitudinal direction of the bicycle frame when the bicycle drive unit is attached to the bicycle frame and in a direction perpendicular to the crankshaft, and the assist motor is disposed near the other end of the housing with respect to the longitudinal direction of the bicycle frame when the bicycle drive unit is attached to the bicycle frame.

In accordance with an eighth aspect of the present invention, the according to the first aspect is configured so that the housing includes two side surfaces on which are formed the holes in which is disposed the crankshaft, and an outer perimeter surface which connects the two side surfaces. The housing further includes a plurality of attaching portions for attaching to the frame on an outer perimeter surface.

In accordance with a ninth aspect of the present invention, the bicycle drive unit according to the first aspect is configured so that half or more of the attaching portions are positioned above a portion to which is disposed the crankshaft, when the housing is attached to the bicycle frame.

In accordance with a tenth aspect of the present invention, the bicycle drive unit according to the first aspect is configured so that three of the attaching portions each includes a hole, the holes of the attaching portions have center axes so that lines connecting each of the center axes of the holes form a triangular shape, on a plane that is perpendicular to the crankshaft and that encompasses the center axis of the crankshaft.

In accordance with an eleventh aspect of the present invention, the bicycle drive unit according to the first aspect further comprises a transmission mechanism configured to change speed and output a rotation which is inputted to the crankshaft. The transmission mechanism is housed inside the housing.

In accordance with a twelfth aspect of the present invention, the bicycle drive unit according to the first aspect is configured so that the center axis of the crankshaft, a center, axis of the assist motor, and the center axis of the transmission mechanism are disposed so that lines connecting each of the center axes form a triangular shape, on a plane that is perpendicular to the crankshaft.

In accordance with a thirteenth aspect of the present invention, the bicycle drive unit according to the first aspect is configured so that the triangular shape is substantially an isosceles triangle having the center axis of the assist motor as an apex.

In accordance with a fourteenth aspect of the present invention, the bicycle drive unit according to the first aspect is configured so that when the bicycle drive unit is attached to the frame, the center axis of the transmission mechanism is disposed below the center axis of the crankshaft, when viewed from a direction parallel to the center axis of the crankshaft.

In accordance with a fifteenth aspect of the present invention, the bicycle drive unit according to the first aspect is configured so that the transmission mechanism includes a planetary gear mechanism comprising an input body, an output body, and a transmission body, a one-way clutch which is disposed between the input body and the output body, and a switching mechanism which can switch between a first state which permits a rotation of the transmission body with respect to the housing and a second state which regulates the rotation of the transmission body with respect to the housing.

In accordance with a sixteenth aspect of the present invention, the bicycle drive unit according to the first aspect is configured so that the input body is a carrier, the output body is a ring gear, the transmission body is a sun gear, the transmission mechanism further comprises a transmission shaft which is disposed on an inner perimeter of the sun gear to be integrally rotated with the sun gear and which is rotatably supported to the housing. The switching mechanism comprises a connecting portion which is provided to an opposing portion that opposes the transmission shaft or the housing, and a control portion configured to move the connecting portion from the protruding position to the retracted position. The connecting portion is movably arranged between a protruding position for regulating the rotation of the transmission shaft in at least one direction forming the first state, and a retracted position which does not regulate the rotation of the transmission body forming the second state.

In accordance with a sixteenth aspect of the present invention, the bicycle drive unit according to the first aspect is configured so that the switching mechanism further comprises an actuator configured to switch between the first state and the second state.

In accordance with an eighteenth aspect of the present invention, the bicycle drive unit according to the first aspect is configured so that the bicycle drive unit further comprises the crankshaft.

In accordance with a nineteenth aspect of the present invention, a bicycle according is provided that comprises the bicycle drive unit according to any one of the first to eighteenth aspects and further comprises a rear suspension.

The bicycle drive unit and a bicycle equipped with this drive unit can prevent the distance between the crankshaft and the rear end from becoming long.

Also other objects, features, aspects and advantages of the disclosed bicycle drive unit will become apparent to those skilled in the art from the following detailed description, which, taken in conjunction with the annexed drawings, discloses one illustrative embodiment of the bicycle drive unit.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the bicycle field from this disclosure that the following descriptions of the embodiments are provided for illustration only and not for the purpose of limiting the invention as defined by the appended claims and their equivalents.

Figure 1:
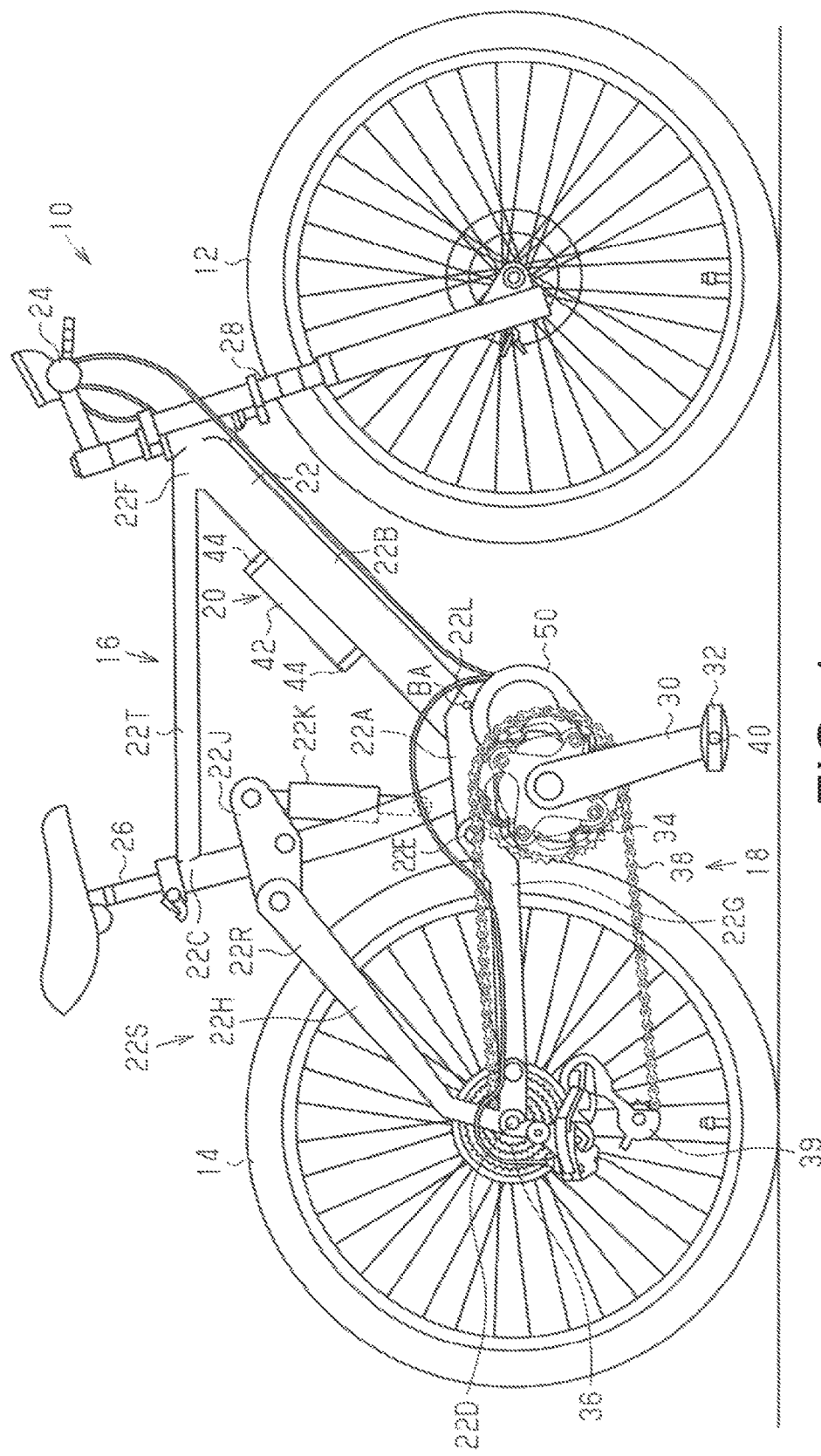
FIG. 1 is a left side elevational view of a bicycle that is equipped with a bicycle drive unit in accordance with one illustrated embodiment.

Referring initially to FIG. 1, a bicycle 10 is illustrated that is equipped with a drive unit 50 in accordance with a first embodiment. In addition to the drive unit 50, the bicycle 10 basically comprises a front wheel 12, a rear wheel 14, a vehicle body 16, a drive mechanism 18 and a battery unit 20. The vehicle body 16 comprises a frame 22, a handlebar 24, a seat post 26 which is connected to the frame 22, and a front fork 28. The handlebar 24 is connected to the frame 22. The seat post 26 is connected to the frame 22. The front fork 28 is connected to the frame 22. The front fork 28 comprises a front suspension. The frame 22 comprises a front frame 22F and a rear frame 22R.

The front frame 22F comprises a support portion 22A, a down tube 22B, a seat tube 22C to which is attached the seat post 26, and a top tube 22T. The down tube 22B extends forward from the support portion 22A, which supports the crankshaft 54. The seat post 26 is attached seat tube 22C. The top tube 22T is connected to the down tube 22B and the seat tube 22C. The front frame 22F shown in FIG. 1 can be a frame with another shape.

The rear frame 22R comprises a chain stay 22G and a swing arm 22S. The chain stay 22G extends rearward from the rear end portion of the front frame 22F. The swing arm 22S comprises a seat stay 22H which is connected to the rear end of the chain stay 22G. The chain stay 22G of the swing arm 22S is rotatably attached to the front frame 22F by a pivot shaft 22E. A rear suspension 22K is provided between the rear frame 22R and the front frame 22F. One end of the rear suspension 22K is attached to the seat stay 22H of the swing arm 22S via a link 22J. The other end of the rear suspension 22K is attached to the front frame 22F. One end of the link 22J is rotatably coupled to the seat stay 22H. The other end of the link 22J is rotatably coupled to the rear suspension 22K. An intermediate portion of the link 22J between the ends is rotatably coupled to the seat tube 22C. The chain stay 22G, the seat stay 22H, and the link 22J are each provided in pairs at intervals in a direction parallel to the crankshaft 54 of the drive unit 50. The structure for attaching the rear frame 22R to the front frame 22F can be a different structure as needed and/or desired. The pivot shaft 22E is disposed above the crankshaft 54. The axis of the pivot shaft 22E is disposed on the path of the chain 38 or in a position closer to the axis of the crankshaft 54 than the path of the chain 38, when viewed from a direction parallel to the crankshaft 54. The axle of the rear wheel 14 is attached to a rear end 22D, which is the rear end of the rear frame 22R. The support portion 22A detachably supports the drive unit 50. The support portion 22A comprises a plurality of connecting portions 22L. The connecting portions 22L are spaced apart from each other in the width direction of the bicycle 10. The connecting portions 22L are coupled to an attaching portion 74 of the drive unit 50 as mentioned below. The connecting portions 22L are provided so as to sandwich the attaching portion 74 of the drive unit 50 from both sides of the bicycle 10 in the width direction.

Figure 2:
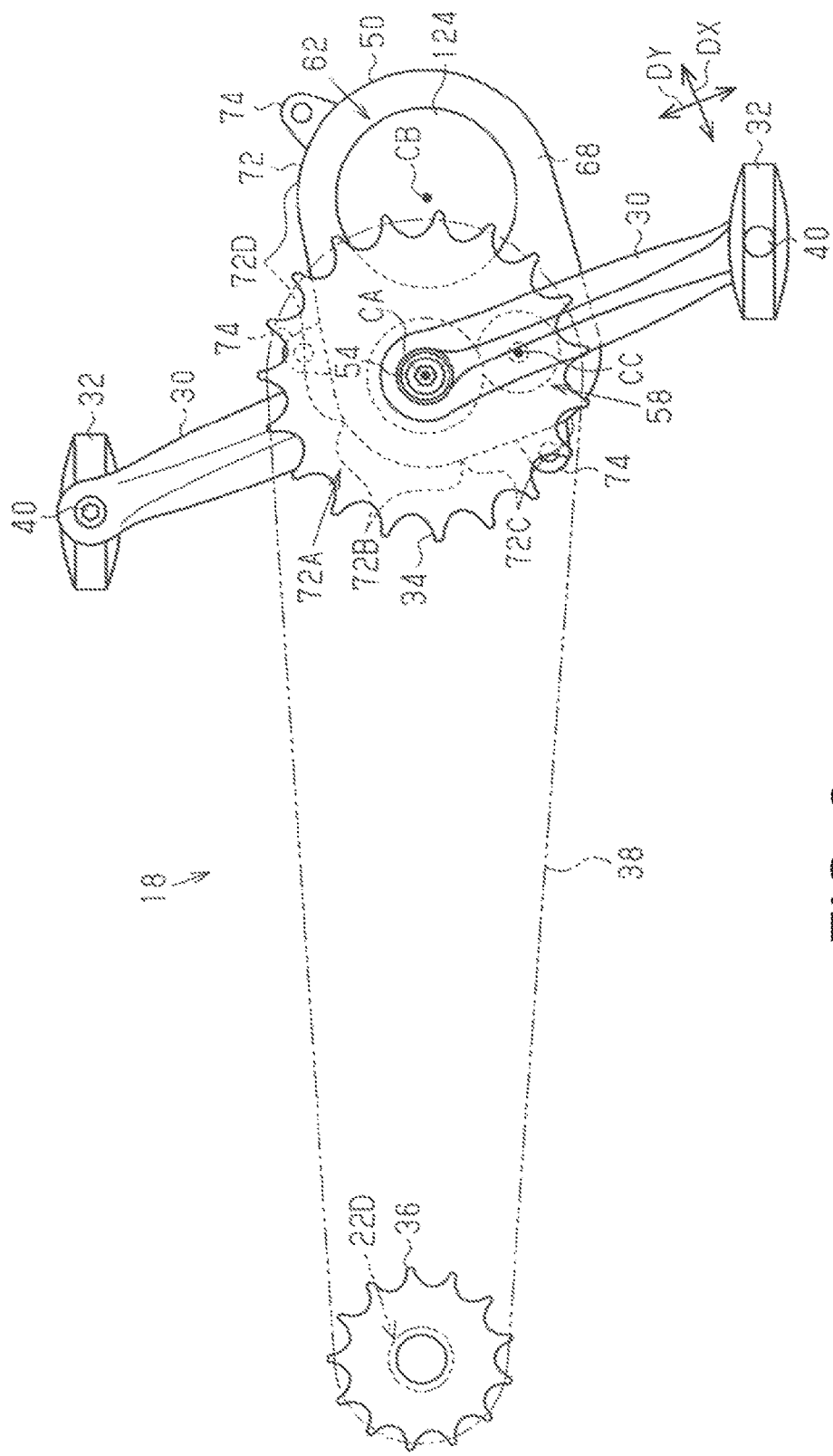
FIG. 2 is a left side view of a drive mechanism of the bicycle of FIG. 1.

As shown in FIG. 2, a drive mechanism 18 comprises a left and right crank arm 30, a left and right pedal 32, a front sprocket 34, a rear sprocket 36 and a chain 38. The left and right crank arms 30 are rotatably attached to the frame 22 (see FIG. 1) via the crankshaft 54 of the drive unit 50. The pedals 32 are attached to the crank arms 30 so that each of the pedals 32 are rotatable around a pedal shaft 40.

The front sprocket 34 is coupled to the output unit 56 (see FIG. 5) of the drive unit 50. The front sprocket 34 is provided coaxially with the crankshaft 54. The rear sprocket 36 is rotatably attached around an axle of the rear wheel 14 (see FIG. 1). The rear sprocket 36 is coupled to the rear wheel 14 (see FIG. 1) via a one-way clutch (not shown). In the present embodiment, the rear sprocket 36 comprises a plurality of sprockets. The chain 38 is wound to the front sprocket 34 and the rear sprocket 36. When the crank arms 30 are rotated by the manual drive force that is applied to the pedals 32, the rear wheel 14 (see FIG. 1) is rotated by the front sprocket 34, the chain 38, and the rear sprocket 36. The drive mechanism 18 further comprises a rear derailleur 39. The rear derailleur 39 switches the chain 38 between a plurality of rear sprockets. The rear derailleur 39 can be an electric derailleur which is shifted based on instructions from a control device 64, as described below, or a mechanical derailleur which is operated by a user operating a shift operating unit via a cable.

As shown in FIG. 1, the battery unit 20 comprises a battery 42 and a battery holder 44. The battery holder 44 is configured to detachably attach the battery 42 to the frame 22. The battery 42 includes one or a plurality of battery cells. The battery 42 is formed of a rechargeable battery. The battery 42 is electrically connected to the drive unit 50 and supplies power to the drive unit 50.

Figure 5:
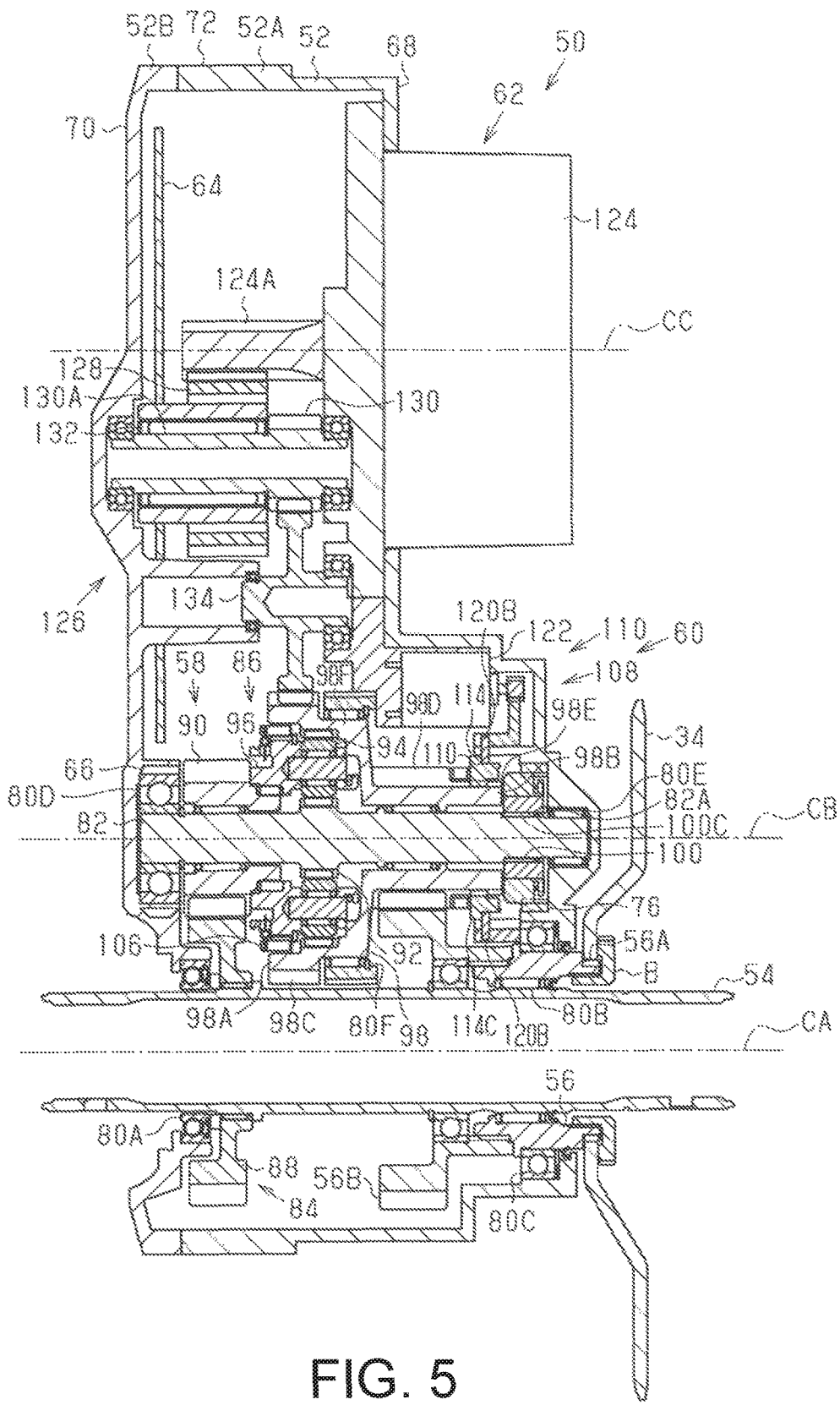
FIG. 5 is a cross-sectional view of section line 5-5 of FIG. 4.

As shown in FIG. 5, the drive unit 50 comprises a housing 52, a crankshaft 54, an output unit 56, a transmission mechanism 58, a switching mechanism 60, an assist mechanism 62, a control device 64 and a torque sensor 66. The output unit 56 is configured to output rotation inputted via the crankshaft 54 and/or the assist mechanism 62. The transmission mechanism 58 is configured to output the rotation that is inputted from the crankshaft 54 to the output unit 56.

The housing 52 comprises a first side surface 68, a second side surface 70 and an outer perimeter surface 72. The first side surface 68 is disposed on the side with the front sprocket 34. The second side surface 70 is disposed on the opposite side from the front sprocket 34. The outer perimeter surface 72 connects the first side surface 68 and the second side surface 70. The housing 52 is formed by combining a first portion 52A and a second portion 52B. The first portion 52A comprises the first side surface 68 and a part of the outer perimeter surface 72. The second portion 52B comprises the second side surface 70 and the other portion of the outer perimeter surface 72.

Figure 3:
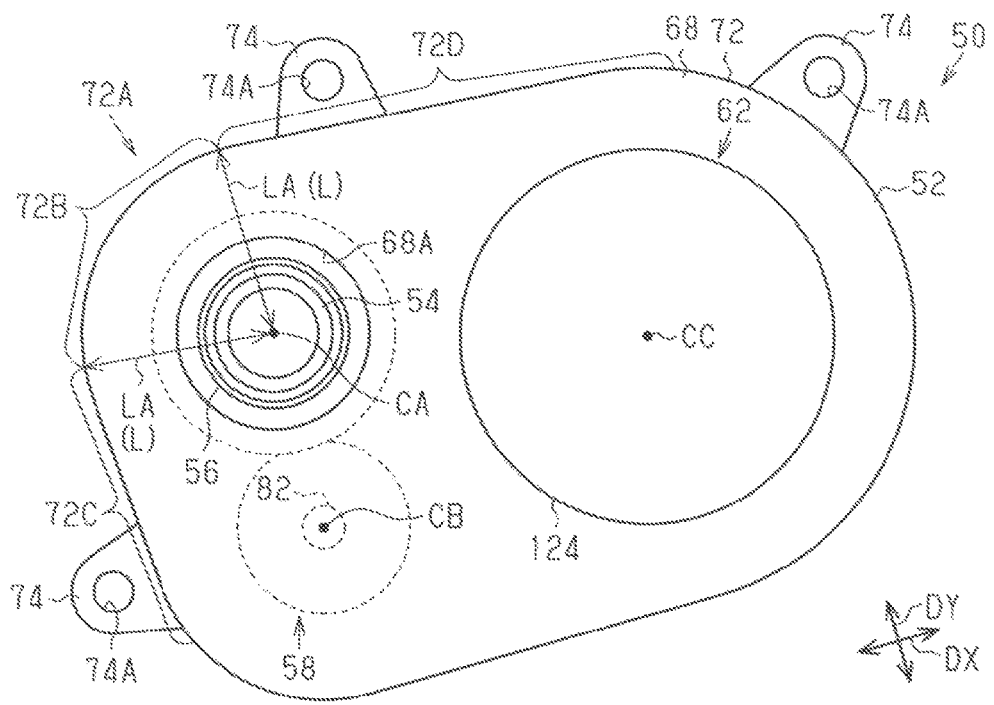
FIG. 3 is a left side view of the drive unit of FIG. 2.
Figure 4:
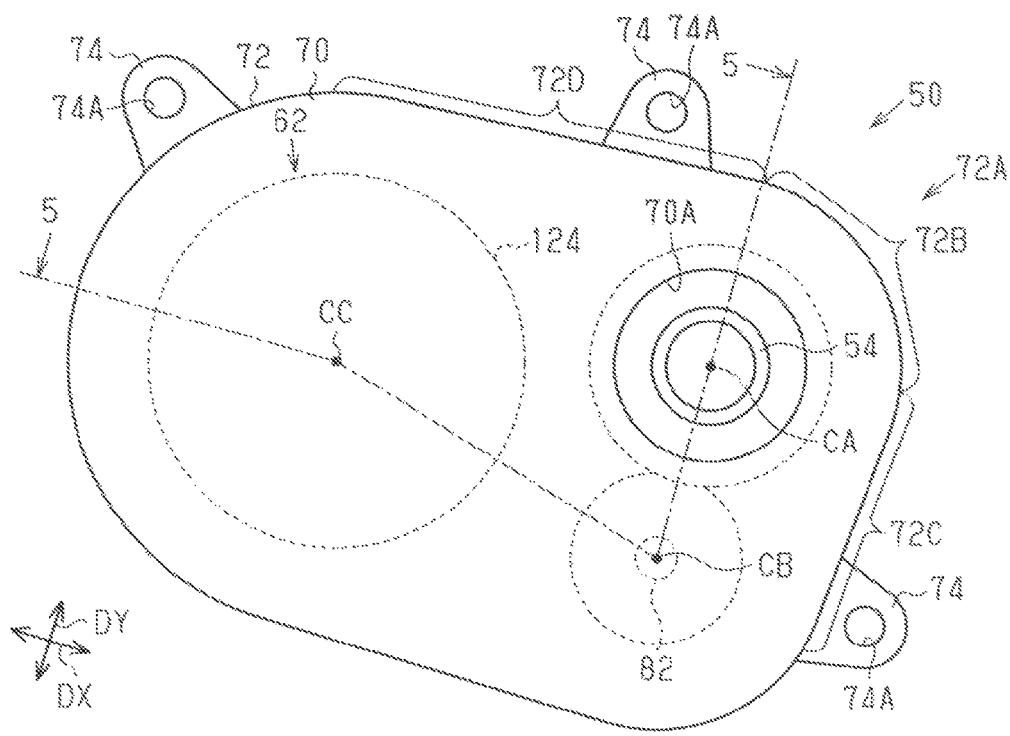
FIG. 4 is a right side view of the drive unit of FIG. 2.

As shown in FIG. 3, the first side surface 68 of the housing 5 has a hole 68A in which is disposed the crankshaft 54. As shown in FIG. 4, the second side surface 70 of the housing 52 has a hole 70A in which is disposed the crankshaft 54.

As shown in FIGS. 3 and 4, the first side surface 68 and the second side surface 70 extend a longitudinal direction DX and a lateral direction DY. That is, the housing 52 extend from the crankshaft 54 in the longitudinal direction DX and the lateral direction DY which are perpendicular to the crankshaft 54.

The outer perimeter surface 72 comprises a rear end surface 72A. As shown in FIG. 2, when the drive unit 50 is attached to the frame 22 (see FIG. 1), the rear end surface 72A is the portion that is located on the side near the rear end 22D of the frame 22, when viewed from a direction parallel to the center axis CA of the crankshaft 54.

As shown in FIG. 3, the rear end surface 72A comprises a first portion 72B across a prescribed range around the crankshaft 54, when viewed from a direction parallel to the center axis CA of the crankshaft 54. The distance L extends from the first portion 72B to the center axis CA of the crankshaft 54 which corresponds to a minimum distance LA. The housing 52 is formed so that the minimum distance LA is equal to or less than 50 mm and greater than the radius of the crankshaft 54. The minimum distance LA is preferably equal to or less than 45 mm. In all parts of the first portion 72B, the distance L is the minimum distance LA. That is, in the first portion 72B, the distance L is constant. The rear end surface 72A and the first portion 72B can match. The prescribed range is selected from a range of 30° to 120° around the crankshaft 54. In the present embodiment, the prescribed range is a range of about 90° around the crankshaft 54. In the present embodiment, the prescribed range is a range of slightly less than 90° around the crankshaft 54.

The outer perimeter surface 72 comprises a second portion 72C and a third portion 72D which are continuous with the first portion 72B. As shown in FIG. 2, the second portion 72C comprises a planar shape. The second portion 72C is positioned below the first portion 72B when the drive unit 50 is attached to the frame 22 (see FIG. 1). The second portion 72C is substantially parallel to the lateral direction DY of the housing 52. The third portion 72D comprises a planar shape. The third portion 72D is positioned above the first portion 72B when the drive unit 50 is attached to the frame 22 (see FIG. 1). The third portion 72D is substantially parallel to the longitudinal direction DX of the housing 52.

As shown in FIG. 3, there are the of the attaching portions 74 for attaching the drive unit 50 to the frame 22 (see FIG. 1). The attaching portions 74 are provided on the outer perimeter surface 72 of the housing 52. Each of the attaching portions 74 is provided to a position away from each other in the circumferential direction around the crankshaft 54. Each of the attaching portions 74 is formed in a portion of the outer perimeter surface 72 excluding the first portion 72B.

Each of the attaching portions 74 protrudes outward from the outer perimeter surface 72. Each of the attaching portions 74 has a length which is 80 mm or more, preferably a length which is 90 mm or more, in a direction parallel to the crankshaft 54. The length of each of the attaching portions 74 in a direction parallel to the crankshaft 54 is shorter than the minimum distance between the left and right crank arms 30 (see FIG. 2). The length of each of the attaching portions 74 in a direction parallel to the crankshaft 54 is approximately equal to the distance between the connecting portions 22L. Each of the attaching portions 74 comprises a hole 74A which extends in the axial direction of the crankshaft 54. A hole (not shown) is formed in a position corresponding to the hole 74A of each of the attaching portions 74 of the connecting portion 22L shown in FIG. 1. A bolt BA (see FIG. 1) is inserted in the hole 74A of each attaching portion 74 and a hole (not shown) of the connecting portion 22L of the frame 22, and the drive unit 50 is attached to the frame 22 by each of the attaching portions 74 (see FIG. 2) being sandwiched by the connecting portions 22L by the head of the bolt BA and a nut (not shown).

As shown in FIG. 2, two of the attaching portions 74, which is more than half of the attaching portions 74, are positioned above the portion in which the crankshaft 54 is disposed, when the housing 52 is attached to the frame 22 (see FIG. 1). The other one attaching portion 74 of the attaching portions 74 is positioned below the portion in which the crankshaft 54 is disposed, when the housing 52 is attached to the frame 22 (see FIG. 1). In the present embodiment, two of the attaching portions 74, which is more than half of the attaching portions 74, are positioned above the axis of the crankshaft 54, and the other one attaching portion 74 is positioned below the axis of the crankshaft 54, when the housing 52 is attached to the frame 22 (see FIG. 1).

As shown in FIG. 5, the housing 52 houses a portion of the crankshaft 54, a portion of the output unit 56, a transmission mechanism 58, a switching mechanism 60, a portion of the assist mechanism 62, and a control device 64. As shown in FIGS. 2 and 3, the holes 68A and 70A are formed near one ends of the first side surface 68 and the second side surface 70 in the longitudinal direction, and near one end of the lateral direction DY. Accordingly, the crankshaft 54 is disposed near one end in the longitudinal direction DX, and near one end in the lateral direction DY, of the housing 52.

As shown in FIG. 2, a center axis CB of the transmission shaft 82 is the center axis of the transmission mechanism 58. The center axis CB is disposed near one end in the longitudinal direction DX of the housing 52, and near the other end in the lateral direction DY of the housing 52. When the drive unit 50 is attached to the frame 22 (see FIG. 1), the center axis CB of the transmission mechanism 58 is disposed below the center axis CA of the crankshaft 54, when viewed from a direction parallel to the center axis CA of the crankshaft 54.

The center axis CC of the assist motor 124 of the assist mechanism 62 is disposed near the other end in the longitudinal direction of the housing 52, and near the center of the lateral direction DY of the housing 52. When the drive unit 50 is attached to the frame 22 (see FIG. 1), the center axis CC of the assist motor 124 is disposed further in front of the bicycle 10 (see FIG. 1) than the center axis CA of the crankshaft 54, when viewed from a direction parallel to the center axis CA of the crankshaft 54.

As shown in FIG. 5, the crankshaft 54 is rotatably supported to the housing 52. The two ends of the crankshaft 54 are exposed to the outside of the housing 52. A crank arm 30 (see FIG. 2) can be attached to both ends of the crankshaft 54, and the manual drive force is inputted thereto via the crank arm 30. The crankshaft 54 can be a hollow shaft. The outer perimeter part of one end of the crankshaft 54 is supported to the housing 52 via a bearing 80A. The outer perimeter part of the other end of the crankshaft 54 is supported to the output unit 56 via a bearing 80B.

The output unit 56 is formed in a tubular shape. The output unit 56 is disposed around the crankshaft 54 coaxially with the crankshaft 54. One end of the output unit 56 is exposed to the outside of the housing 52. The outer perimeter part of the center portion of the output unit 56 is supported to the housing 52 via a bearing 80C. The output unit 56 comprises an attaching portion 56A that is capable of attaching a front sprocket 34 to the outer perimeter part at one end of the crankshaft 54 in the axial direction. The attaching portion 56A is a spline. The spline on the inner perimeter of the front sprocket 34 is fitted to the attaching portion 56A. The front sprocket 34 is attached to the output unit 56, with a bolt B being screwed into the inner perimeter part of the output unit 56 sandwiching the front sprocket 34. The output unit 56 can be formed as several pikes that are divided in the axial direction.

The transmission mechanism 58 comprises a transmission shaft 82, a transmission mechanism 84, and a planetary gear mechanism 86. The transmission mechanism 58 comprises two shift stages, and can change the speed of the rotation that is inputted from the crankshaft 54 and output the same to the output unit 56.

The transmission shaft 82 is disposed on the outside of the crankshaft 54 in the radial direction. The transmission shaft 82 is provided parallel to the crankshaft 54. The transmission shaft 82 is rotatably supported to the housing 52. The axial ends of the transmission shaft 82 are supported to the housing 52 via bearings 80D and 80E, respectively. The transmission shaft 82 is rotatable around a center axis CB whose position does not change with respect to the crankshaft 54. One end of the transmission shaft 82 is supported by the ball bearing 80D, and the other end is supported by the needle bearing 80E.

The transmission mechanism 84 comprises a first transmission gear 88 and a second transmission gear 90. The first transmission gear 88 is provided around the crankshaft 54 coaxially with the crankshaft 54. The second transmission gear 90 is provided around the transmission shaft 82 coaxially with the transmission shaft 82.

The first transmission gear 88 is an outer gear. The inner perimeter of the first transmission gear 88 is supported to the crankshaft 54 so as to be relatively non-rotatable, by a spline fitting or a press fitting.

The second transmission gear 90 is an outer gear. The second transmission gear 90 is rotatably supported to the transmission shaft 82 via a bearing or the like. The outer gear of the first transmission gear 88 and the outer gear of the second transmission gear 90 are meshed with each other. For this reason, the rotation of the crankshaft 54 is transmitted to the second transmission gear 90 via the first transmission gear 88.

The planetary gear mechanism 86 comprises a sun gear 92, which is a transmission body. The planetary gear mechanism 86 further comprises a plurality of planetary gears 94, a carrier 96, and a ring gear 98. The carrier 96 is an input body, and the ring gear 98 is an output body. The sun gear 92 is provided around the transmission shaft 82 coaxially with the transmission shaft 82. The sun gear 92 is integrated with the transmission shaft 82. For this reason, the transmission shaft 82 can be integrally rotated with the sun gear 92.

The planetary gears 94 are disposed around the sun gear 92. The planetary gears 94 are disposed between the sun gear 92 and the ring gear 98. The gear teeth of the planetary gears 94 are meshed with the gear teeth of the sun gear 92 and the inner gear of the ring gear 98.

The carrier 96 rotatably supports the planetary gears 94, and integrally rotates the planetary gears 94 around the sun gear 92. One axial end of the carrier 96 of the transmission shaft 82 is joined with the first transmission gear 88 by a spline fitting, a press fitting, or the like, and can be integrally rotated with the first transmission gear 88. In other words, the carrier 96 is rotatably supported to the transmission shaft 82 via the first transmission gear 88. The rotation of the crankshaft 54 is inputted to the carrier 96 via the first transmission gear 88.

The ring gear 98 is provided around the sun gear 92 coaxially with the sun gear 92. The ring gear 98 comprises a first end 98A and a second end 98B. The first end 98A is located on the side that is joined with the planetary gear 94 with respect to the axial direction of the transmission shaft 82. The second end 98B is located on the opposite side from the first end 98A with respect to the axial direction of the transmission shaft 82. The first end 98A of the ring gear 98 covers the planetary gears 94. The inner perimeter of the second end 98B of the ring gear 98 is rotatably supported to the transmission shaft 82 via a bearing or the like.

First gear teeth 98C are formed on the outer perimeter of the first end 98A of the ring gear 98. Second gear teeth 98D is formed on the outer perimeter of the second end 98B of the ring gear 98. The second gear teeth 98D are meshed with gear teeth 56B which is formed on the outer perimeter of the output unit 56. That is, the ring gear 98 outputs a rotation to the outside. The number of the second gear teeth 98D is less than the number of the first gear teeth 98C. An annular portion 98F is formed between the first gear teeth 98C and the second gear teeth 98D of the ring gear 98. The annular portion 98F is rotatably supported to the housing 52 via a bearing 80F.

The switching mechanism 60 switches the gear changing state of the transmission mechanism 58 between a first state and a second state. In the first state, a rotation of the sun gear 92 with respect to the housing 52 is permitted. In the second state, a rotation of the sun gear 92 with respect to the housing 52 is restricted. The switching mechanism 60 comprises a retaining member 100, a fixing member 102 (see FIG. 6), a first biasing member 104 (see FIG. 6), a one-way clutch 106, a plurality of connecting portions 108, and a control portion 110.

The retaining member 100 has a cylindrical shape. The retaining member 100 is provided around the transmission shaft 82 coaxially with the transmission shaft 82. The retaining member 100 is provided fixed to the transmission shaft 82 and is integrally rotated with the transmission shaft 82. The retaining member 100 comprises a spline groove 100C in the inner perimeter part. The spline groove 100C is attached to a spline groove 82A which is provided on the outer perimeter of the transmission shaft 82 and prevents the rotation of the transmission shaft 82 around the center axis CB. The movement of the retaining member 100 in the axial direction is restricted by a stepped portion 82B which is provided to the transmission shaft 82 having a different diameter shown in FIG. 6, and a fixing member 102. The fixing member 102 is formed of for example, an E ring. The retaining member 100 is disposed in a position adjacent to the second end 98B of the ring gear 98 in the axial direction of the transmission shaft 82.

The connecting portions 108 are provided around the center axis CB of the transmission shaft 82. Each of the connecting portions 108 comprises a pawl member 112. Each pawl member 112 is attached to the retaining member 100 so that at least a portion thereof can be housed in a groove 100A, which is formed on the outer perimeter part of the retaining member 100. The end of each pawl member 112 on the opposite side of the ring gear 98 of the transmission shaft 82 opposes an opposing portion 76 of the housing 52. The opposing portion 76 is formed in an annular shape around the axis of the transmission shaft 82. The inner perimeter part of the opposing portion 76 has a plurality of grooves 76A. The grooves 76A are formed in the circumferential direction of the inner perimeter part of the opposing portion 76, at prescribed intervals. Each of the grooves 76A has the same shape as a so-called ratchet groove. Each pawl member 112 protrudes, at least in part, from the groove 100A. Each pawl member 112 can be moved between a joining position that joins with the groove 76A, and a retracted position that separated from the groove 76A of the opposing portion 76. Each pawl member 112 is housed in the groove 100A of the retaining member 100. The joining position in the present embodiment corresponds to the protruding position. The opposing portion 76 can be integrally formed to the housing 52, or can be formed as a separate body from the main body of the housing 52. The opposing portion 76 is preferably formed of metal. In the case that the opposing portion 76 is formed as a separate body from the main body of the housing 52, a mounting portion for mounting the opposing portion 76 in the inner perimeter part of the main body of the housing 52 is formed to prevent the opposing portion 76 from rotating around the center axis CB (see FIG. 5). The main body of the housing 52 can be formed from a resin or be formed from a metal.

The first biasing member 104 is an annular spring. The first biasing member 104 is fitted to a groove 112A which is formed on the outer surfaces of the pawl members 112, and to a circumferential groove (not shown) which is formed on the outer perimeter of the retaining member 100. The first biasing member 104 applies a force to the pawl member 112 toward the joining position.

The control portion 110 comprises an annular member 114, a second biasing member 116, a cam 118 for moving the annular member 114 in the axial direction of the transmission shaft 82, a coupling body 120, and an actuator 122 for driving the cam 118. The actuator 122 is, for example, an electric motor. The actuator 122 switches between a first state and a second state.

The annular member 114 is provided around the ring gear 98 coaxially with the ring gear 98. The annular member 114 covers the second end 98B of the ring gear 98, in a portion that is closer to the connecting portion 108 than the second gear teeth 98D, in the axial direction of the transmission shaft 82.

The annular member 114 has a plurality of recesses 114A, a plurality of grooves 114B, and an annular protrusion 114C. The recesses 114A are formed in the inner perimeter part of the annular member 114. The grooves 114B are formed on the side surface portion (end surface portion in the axial direction) of the annular member 114. The annular protrusion 114C is formed in the outer perimeter part of the annular member 114. The protrusion 114C is formed in a portion of the outer perimeter part of the annular member 114 on the second gear teeth 98D side of the ring gear 98.

The recesses 114A are formed to extend in the axial direction in a portion of the inner perimeter part of the annular member 114 on the ring gear 98 side. The recesses 114A are fitted to protrusions 98E which are formed on the outer perimeter of the ring gear 98, and which extend in the axial direction. The recesses 114A are formed slightly larger than the protrusions 98E. Since the recesses 114A are fitted to the protrusions 98E, the annular member 114 is integrally rotated with the ring gear 98, when the ring gear 98 is rotated. Further, the recesses 114A of the annular member 114 can move along the protrusions 98E (see FIG. 1). For this reason, the annular member 114 can be moved in the axial direction with respect to the ring gear 98.

The grooves 114B are formed on the side surface portion of the annular member 114 on the side of the pawl members 112. The grooves 114B oppose the pawl members 112. Each of the grooves 114B becomes shallower in the axial direction from the other direction to one direction of the circumferential direction. The grooves 114B are formed continuously in the circumferential direction. Further, a stepped portion (not shown) is formed at the boundary of each of the grooves 114B. This stepped portion is inclined from the other direction to one direction of the circumferential direction, from the outer perimeter to the inner perimeter. The inner perimeter surface 114) of the annular member 114 on the side of the connecting portion 108 is continuous with the plurality of grooves 114B, and is formed in an annular shape.

A second biasing member 116 is attached between the ring gear 98 and the end of the annular member 114 on the side of the ring gear 98 in the axial direction of the transmission shaft 82. The second biasing member 116 applies a force to the annular member 114 toward the side of the connecting portion 108.

The cam 118 is disposed around the annular member 114 coaxially with the annular member 114. The cam 118 is rotatably supported to the housing 52 around the axis of the annular member 114. Specifically, the cam 118 is fitted to a cylindrical portion 78 which extends from the end of the housing 52 on the front sprocket 34 (see FIG. 5) side, in the axial direction of the transmission shaft 82. The cam 118 comprises a cam surface 118A and a gear 118B. The cam 118 is formed in an annular shape.

The cam surface 118A is formed on the side surface portion of the cam 118 on the ring gear 98 side, in the axial direction of the transmission shaft 82. The cam surface 118A comprises a portion which is inclined from the side of the ring gear 98 to the side of the connecting portion 108, in one direction of the circumferential direction.

The coupling body 120 comprises an annular portion 120A and a plurality of operation pieces 120B. The operation pieces 120B extend from the annular portion 120A in the radial direction. The annular portion 120A comes in contact with the protrusion 114C of the annular member 114 from the opposite side of the ring gear 98. The operation pieces 120B are provided in the circumferential direction of the annular portion 120A. Here, two of the operation pieces 120B are provided to the positions which are symmetric with respect to the center axis CB (see FIG. 5). The operation pieces 120B of the coupling body 120 are in contact with the cam surface 118A in the axial direction of the transmission shaft 82. The operation pieces 120B of the coupling body 120 are fitted to a groove 78A of the housing 52 extending in the axial direction of the transmission shaft 82, in the circumferential direction of the cam 118. The coupling body 120 can be moved along the groove 78A in the axial direction of the transmission shaft 82.

The actuator 122 is disposed radially outward from the cam 118. The actuator 122 is joined to the gear 118B of the cam 118. The actuator 122 rotates the cam 118 by a prescribed angle. A protrusion (not shown) which is inserted into a hole (not shown) formed in the cylindrical portion 78 of the housing 52 is formed in the inner perimeter part of the cam 118; the rotational angle of the cam 118 is restricted by the end surface of the hole (not shown) in the circumferential direction.

Figure 6:
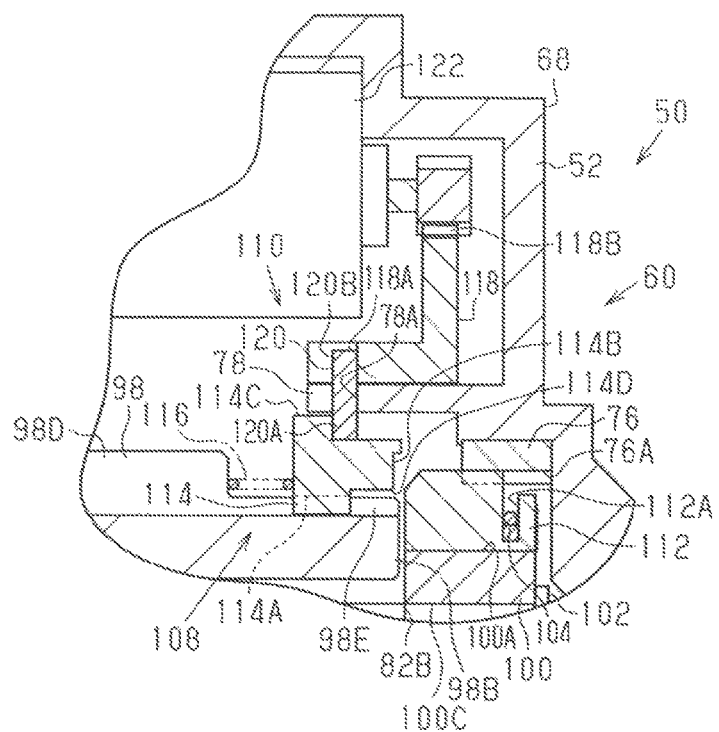
FIG. 6 is a partially enlarged view of when the connecting portion of the switching mechanism of FIG. 1 is in the protruding position.

The operation of the switching mechanism 60 will be described with reference to FIGS. 6 and 7. As shown in FIG. 6, when the rotational phase of the cam 118 is in a phase in which the ring gear 98 side portion of the cam surface 118A and the operation piece 120B of the coupling body 120 are in contact, the annular member 114 is maintained in a position on the side of the ring gear 98 via the coupling body 120. At this time, the grooves 114B of the annular member 114 are separated from the pawl members 112. For this reason, the pawl members 112 are maintained in protruding positions which protrude toward the groove 76A which is formed in the opposing portion 76 of the housing 52. For this reason, the pawl members 112 become unable to rotate relative to the housing 52. The pawl members 112 are supported to the transmission shaft 82 so as to be relatively non-rotatable via the retaining member 100. For this reason, the pawl members 112 restrict the rotation of the transmission shaft 82 and the sun gear 92 (see FIG. 5) in one direction.

Figure 7:
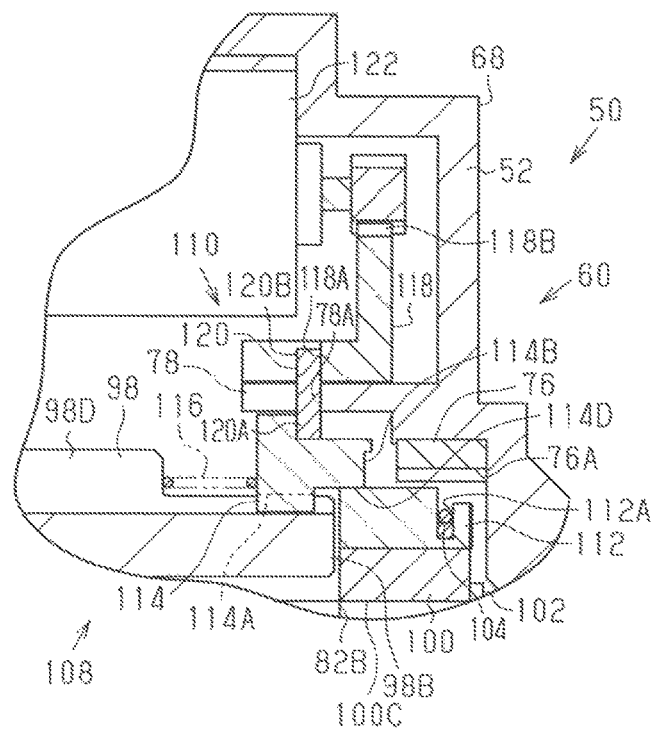
FIG. 7 is a partially enlarged view of when the connecting portion of the switching mechanism of FIG. 1 is in the retracted position.

As shown in FIG. 7, when the rotational phase of the cam 118 moves from a phase in which the ring gear 98 side of the cam surface 118A and the operation pieces 120B are in contact, toward a phase in which the pawl member 112 side of the cam surface 118A and the operation pieces 120B are in contact, the pawl members 112 which are in the protruding positions are moved from the shallow portion to the deep portion of the grooves 114B, accompanying the rotation of the annular member 114 in one direction. At this time, the annular member 114 is maintained in a position on the pawl members 112 side via the coupling body 120.

Then, the outer surfaces of the pawl members 112 are pressed toward the groove 100A by a stepped portion which is formed at the boundary of the adjacent grooves 114B. That is, the annular member 114 of the control portion 110 presses the pawl members 112 of the connecting portions 108 and moves the same from the protruding positions to the retracted positions. The pawl member s112 will be in a state of being pressed by the inner perimeter surface 114D of the annular member 114 of the connecting portion 108; therefore, the pawl members 112 are maintained in the retracted positions housed in the groove 100A of the retaining member 100. For this reason, the pawl members 112 are able to rotate relative to the housing 52. The pawl members 112 are supported to the transmission shaft 82 so as to be relatively non-rotatable via the retaining member 100. For this reason, the pawl members 112 do not restrict the rotation of the transmission shaft 82 and the sun gear 92, which is relatively non-rotatable with respect to the transmission shaft 82, in one direction.

The one-way clutch 106 shown in FIG. 5 is a roller clutch. The one-way clutch 106 is provided between the carrier 96 and the ring gear 98. The one-way clutch 106 integrally rotates the carrier 96 and the ring gear 98, when the rotational speed of the carrier 96 in one direction is greater than or equal to the rotational speed of the ring gear 98. The one-way clutch 106 permits the relative rotation of the carrier 96 and the ring gear 98 when the rotational speed of the carrier 96 in one direction is less than the rotational speed of the ring gear 98 in one direction. Meanwhile, the rotation of the carrier 96 and the ring gear 98 in one direction corresponds to the rotational direction of the crankshaft 54 when the bicycle 10 (see FIG. 1) moves forward.

The gear changing state of the drive unit 50 will be described. When the pawl members 112 is in the protruding positions, the sun gear 92 is restricted from rotating relative to the housing 52. For this reason, when a rotation is inputted to the carrier 96, the planetary gear 94 revolves around the sun gear 92 while being rotated in the same direction as the revolving direction by a reaction force that is generated by the sun gear 92. With the rotation of the planetary gear 94, the ring gear 98 is pressed in the rotational direction of the planetary gear 94, and the ring gear 98 is rotated in the same direction as the carrier 96. At this time, the rotation that is inputted to the carrier 96 is accelerated and outputted from the ring gear 98.

When the pawl members 112 are in the retracted position, the sun gear 92 is not restricted from rotating relative to the housing 52. For this reason, when a rotation is inputted to the carrier 96, the planetary gear 94 will rotate the sun gear 92 and cannot transmit the rotation to the ring gear 98. For this reason, the rotational speed of the carrier 96 in one direction will become greater than or equal to the rotational speed of the ring gear 98. For this reason, a relative rotation of the carrier 96 and the ring gear 98 is restricted, and the carrier 96 and the ring gear 98 are integrally rotated, by the one-way clutch 106. Furthermore, at this time, since the sun gear 92 is pressed by the planetary gear 94 in the same direction as the carrier 96 and the ring gear 98, the sun gear 92 is also integrally rotated with the carrier 96 and the ring gear 98. In other words, the one-way clutch 106 controls the rotation of the sun gear 92.

The assist mechanism 62 comprises an assist motor 124 and a decelerating mechanism 126. The assist motor 124 is disposed on the outside of the crankshaft 54 in the radial direction. The assist motor 124 is connected to the power transmission path, from the crankshaft 54 to the output unit 56. The output shaft 124A of the assist motor 124 is disposed parallel to the crankshaft 54. The assist motor 124 is provided to the housing 52 with a part thereof exposed from the housing 52.

The decelerating mechanism 126 comprises a first reduction gear 128, a second reduction gear 130, a one-way clutch 132, and a third reduction gear 134. The first reduction gear 128 has a cylindrical shape. Since the first reduction gear 128 is connected to the output shaft 124A of the assist motor 124, the rotation of the assist motor 124 is inputted to the first reduction gear 128.

The second reduction gear 130 is disposed coaxially with the first reduction gear 128. The second reduction gear 130 is connected with the first reduction gear 128 via the one-way clutch 132. The second reduction gear 130 comprises a one-way clutch 132 and a support portion 130A for supporting the first reduction gear 128 in the outer perimeter part, and the two ends thereof in the axial direction are rotatably supported to the housing 52 via a bearing or the like.

The one-way clutch 132 transmits the rotation in one direction from the first reduction gear 128 to the second reduction gear 130, and does not transmit the rotation in one direction from the second reduction gear 130 to the first reduction gear 128.

The second reduction gear 130 is connected to the third reduction gear 134. The rotation of the second reduction gear 130 in one direction is transmitted to the third reduction gear 134. The two ends of the third reduction gear 134 are rotatably supported to the housing 52 via a bearing or the like.

The third reduction gear 134 is connected to the first gear 98C of the ring gear 98. For this reason, the torque of the assist motor 124 is decelerated by the decelerating mechanism 126 and inputted to the ring gear 98.

The control device 64 drives the assist motor 124 according to the manual drive force that is applied to the crankshaft 54. The control device 64 is provided inside the housing 52. The control device 64 comprises a circuit board, and the main surface of the circuit board is disposed so as to be perpendicular to the crankshaft 54. The manual drive force is detected by, for example, a torque sensor 66 which is attached to the crankshaft 54 or the transmission mechanism 58.

The torque sensor 66 is provided in the vicinity of a bearing 80D, which supports one end of the transmission shaft 82. The torque sensor 66 is provided to the input side end of the transmission shaft 82. The torque sensor 66 is, for example, a load cell, and comprises a support member which is in contact with the bearing 80D and a strain gauge which is attached to the support member.

When the torque sensor 66 detects a torque that is greater than or equal to a prescribed torque, the control device 64 drives the assist motor 124 according to the torque that is detected by the torque sensor 66. The control device 64 controls the actuator 122. The control device 64 is connected to a shift operating unit, which is not shown, and drives the actuator 122 based on a signal from the shift operating unit. The shift operating unit is realized by a shift switch and a shift lever, which are provided to a handlebar 24 (see FIG. 1) of the bicycle 10. The shift operating unit can be connected to the control device 64 by electrical wiring, or, connected to the control device 64 wirelessly. The control device 64 can drive the actuator 122 based on, for example, a detection signal of a sensor that is provided to the bicycle 10. Examples of the sensor include a speed sensor for detecting the speed of the bicycle 10 (see FIG. 1) and a cadence sensor for detecting the cadence of the crank. With the control device 64 driving the actuator 12, the drive unit 50 functions as a two-step transmission device.

The power transmission path of the drive unit 50 will be described. The assist motor 124 is coupled to the ring gear 98. At least a part of the switching mechanism 60 is coupled to the transmission path between the assist motor 124 and the output unit 56. For this reason, in the case that the assist motor 124 is being driven, the torque of the assist motor 124 is added to the torque that is transmitted to the annular member 114. Accordingly, the control portion 110 moves the pawl member 112 of the connecting portion 108 from the protruding position to the retracted position, using the manual drive force and the rotational force of the assist motor 124. That is, the switching mechanism 60 can switch the gear changing state of the transmission mechanism 58, using the rotational force of the assist motor 124. Further, when the assist motor 124 is not being driven, the control portion 110 can move the pawl member 112 of the connecting portion 108 from the protruding position to the retracted position, by using only the manual drive force.

Figure 8:
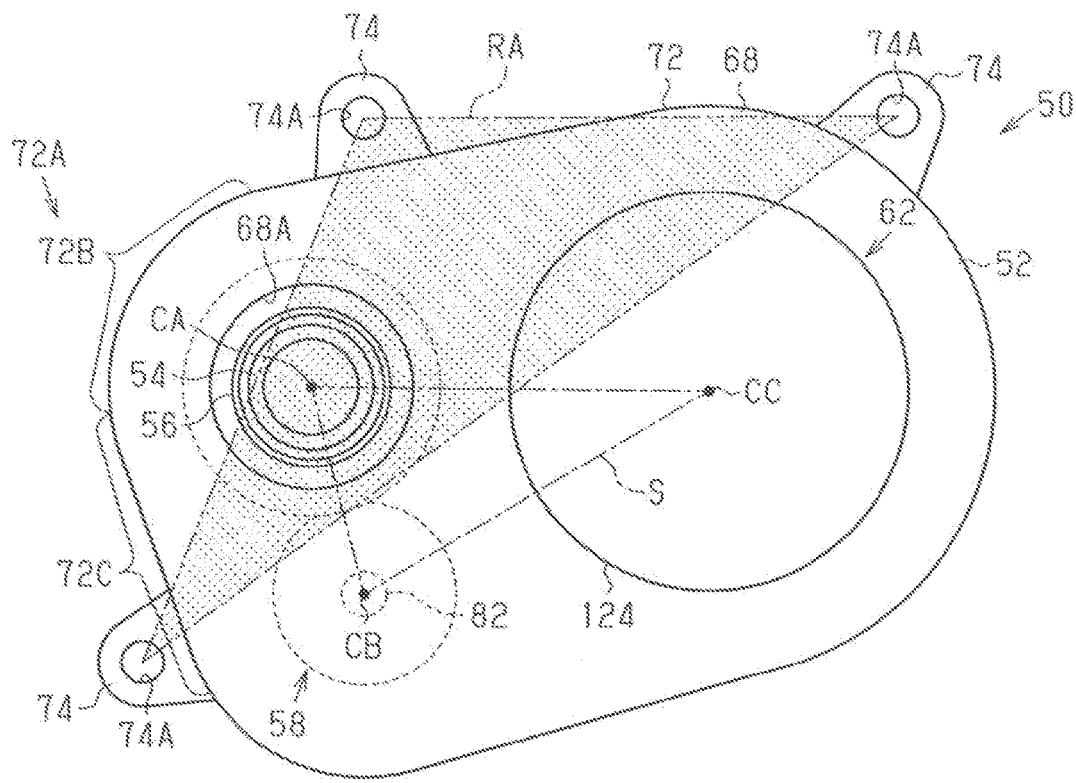
FIG. 8 is a left side view showing the positional relationship of the members of the drive unit of FIG. 2.

The positional relationship of each member in the housing 52 will be described with reference to FIG. 8. The centers of the holes 68A in which is disposed the crankshaft 54 are included in a range RA surrounded by the three attaching portions 74, on a plane that is perpendicular to the crankshaft 54. In other words, the axis of the crankshaft 54 is included in a range RA surrounded by the three attaching portions 74, on a plane that is perpendicular to the crankshaft 54.

The center axis CA of the crankshaft 54, the center axis CC of the assist motor 124, and the center axis CB of the transmission shaft 82, which is the center axis of the transmission mechanism 58, are disposed so that lines connecting each of the center axes CA, CB, and CC, form a triangular shape S, on a plane that is perpendicular to the crankshaft 54. The triangular shape S is substantially an isosceles triangle having the center axis CC of the assist motor 124 as the apex. The line that connects the center axis CA of the crankshaft 54 and the center axis CB of the transmission shaft 82 is substantially parallel to the second portion 72C. For this reason, the distance from any point on the line that connects the center axis CA of the crankshaft 54 and the center axis CB of the transmission shaft 82 to the second portion 72C is substantially constant.

Figure 9:
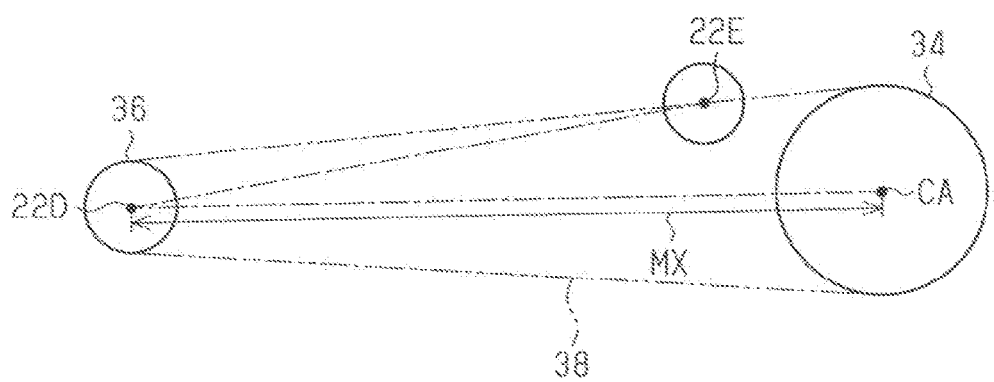
FIG. 9 is a schematic view showing the relationship between the frame and the drive unit of FIG. 1.

The action of the drive unit 50 will be described. As shown in FIG. 3, in the drive unit 50, the distance L from the crankshaft 54 to the rear end surface 72A is short. For this reason, the distance MX from the center axis CA of the crankshaft 54 to the rear end shown in FIG. 9 can be made short. That is, the distance from the center axis CA of the crankshaft 54 to the rotating shaft of the rear wheel 14 shown in FIG. 9 can be made short. In a bicycle 10 equipped with such a drive unit 50, the operability of the bicycle 10 can be improved compared to a bicycle equipped with a conventional drive unit.

In the drive unit 50, since the distance L from the crankshaft 54 to the rear end surface 72A is short, the axis of the pivot shaft 22E can be disposed on the path of a chain 38 when the chain 38 is hung on the rear sprocket 36 with the smallest diameter, or in a position closer to the axis of the crankshaft 54 than the path of the chain 38, when viewed from a direction parallel to the crankshaft 54. The direction in which the rear frame 22R is pulled by the tensile force of the chain 38 can be suppressed from becoming the opposite direction with respect to the direction in which the rear frame 22R is moved when the rear suspension 22K is contracted, and the operation of the rear suspension 22K being hindered can be suppressed. The number of teeth of the front sprocket 34 is preferably selected from 25 or more, such as 30, 32, or 34.

The drive unit 50 exerts the following effects.

(1) In the drive unit 50, the minimum distance LA from the center axis CA of the crankshaft 54 to the rear end surface 72A is equal to or less than 50 mm. For this reason, the distance MX from the center axis CA of the crankshaft 54 to the rear end 22D can be made short.

(2) In the drive unit 50, the minimum distance LA from the center axis CA of the crankshaft 54 to the rear end surface 72A is equal to or less than 45 mm. For this reason, the distance MX from the center axis CA of the crankshaft 54 to the rear end 22D can be made even shorter.

(3) The rear end surface 72A of the housing 52 comprises a first portion 72B whose distance LA over a prescribed range around the crankshaft 54 is constant. For this reason, even if the mounting angle of the drive unit 50 to the frame 22 is different, in the range of the first portion 72B, the distance L from the crankshaft 54 to the rear end side portion of the housing 52 becomes the minimum distance LA. For this reason, the distance MX from the center axis CA of the crankshaft 54 to the rear end 22D can be made short, even if the tilt angle due to mounting is different.

(4) The three attaching portions 74 are formed so that the centers of the holes 68A, 70A in which is disposed the crankshaft 54 are included in a range RA surrounded by the three attaching portions 74. For this reason, the crankshaft 54 is stably supported in a state in which the drive unit 50 is attached to the frame 22.

(5) The center axis CA of the crankshaft 54, the center axis CC of the assist motor 124, and the center axis CB of the transmission mechanism 58 are different when viewed from the axial direction of the crankshaft 54. For this reason, the number of parts which are disposed around the crankshaft 54, coaxially with the crankshaft 54, can be reduced, compared to when providing at least one of the assist motor 124 and the transmission mechanism 58 coaxially with the crankshaft 54. For this reason, the crankshaft 54 can be put closer to the outer perimeter surface 72. Accordingly, the minimum distance LA can be reduced.

Modified Examples

The specific form that the bicycle drive unit can take is not limited to the forms illustrated in the above-described embodiments. The bicycle drive unit can take various forms different from the above-described embodiments. The modified examples of the above-described embodiments shown below are examples of the various forms that the bicycle drive unit can take.

The center axis CA of the crankshaft 54, the center axis CB of the transmission shaft 82, and the center axis CC of the assist motor 124 can be disposed so that the triangular shape S would be substantially an equilateral triangle.

The center axis CA of the crankshaft 54, the center axis CB of the transmission shaft 82, and the center axis CC of the assist motor 124 can also be disposed in a substantially linear shape. In this case, the housing 52 becomes long in the longitudinal direction DX.

There can be one, two, four or more attaching portions 74.

The attaching portions 74 can be formed so that all of the attaching portions 74 are positioned above the crankshaft 54, when attached to the bicycle 10. Furthermore, the attaching portions 74 can also be formed so that half or less, or zero attaching portions 74 are positioned below the crankshaft 54, when attached to the bicycle 10.

The crankshaft 54 can be omitted from the drive unit 50, and a crankshaft which is a separate body from the drive unit 50 can be attached.

The planetary gear mechanism 86 can be modified as shown in (A)-(E) below.

(A) The rotation of the crankshaft 54 is inputted to the ring gear, which is an input body, the rotation of the carrier, which is an output body, is outputted to the output unit 56, and the rotation of the sun gear, which is a transmission body, is controlled by the switching mechanism 60.

(B) The rotation of the crankshaft 54 is inputted to the carrier, which is an input body, the rotation of the sun gear, which is an output body, is outputted to the output unit 56, and the rotation of the ring gear, which is a transmission body, is controlled by the switching mechanism 60.

(C) The rotation of the crankshaft 54 is inputted to the sun gear, which is an input body, the rotation of the carrier, which is an output body, is outputted to the output unit 56, and the rotation of the ring gear, which is a transmission body, is controlled by the switching mechanism 60.

(D) The rotation of the crankshaft 54 is inputted to the sun gear, which is an input body, the rotation of the ring gear, which is an output body, is outputted to the output unit 56, and the rotation of the carrier, which is a transmission body, is controlled by the switching mechanism 60.

(E) The rotation of the crankshaft 54 is inputted to the carrier, which is an input body, the rotation of the sun gear, which is an output body, is outputted to the output unit 56, and the rotation of the carrier, which is a transmission body, is controlled by the switching mechanism 60.

The transmission mechanism 58 can be changed to a transmission mechanism comprising a plurality of sun gears 92, which can switch a sun gear 92, which regulates the rotation, of the plurality of sun gears 92. Changing to a transmission mechanism which does not include a planetary gear mechanism 86 is also possible. In short, any transmission mechanism can be employed as long as the transmission mechanism is able to change the gear ratio that is inputted to the crankshaft 54.

The actuator 122 can be omitted. In this case, the operating device that is attached to the bicycle 10 and the switching mechanism 60 are connected by a wire, and the cam 118 is operated by the operation of the wire.

The drive unit 50 can be mounted to a bicycle 10 which does not comprise a rear suspension 22K.

What is claimed is:

1. A bicycle drive unit comprising:
an assist motor configured to apply an assisting force to a manual drive force, which is inputted from a crankshaft, and
a housing at least partially disposed around the assist motor and at least a part of the crankshaft;
the housing being configured so that, when the bicycle drive unit is attached to a bicycle frame, a minimum distance from a center axis of the crankshaft and a rear end surface of the housing on a rear end side of the housing is equal to or less than 50 mm and greater than a radius of the crankshaft, when viewed from a direction that is parallel to the center axis of the crankshaft.

2. The bicycle drive unit as recited in claim 1, wherein the rear end surface of the housing includes a portion whose distance to the center axis of the crankshaft is equal to or less than 50 mm and greater than the radius of the crankshaft over a prescribed range around the crankshaft, when viewed from a direction that is parallel to the center axis of the crankshaft.

3. The bicycle drive unit as recited in claim 1, wherein the minimum distance is equal to or less than 45 mm.

4. The bicycle drive unit as recited in claim 1, wherein the rear end surface of the housing includes a portion whose distance to the center axis of the crankshaft is constant over a prescribed range around the crankshaft, when viewed from a direction that is parallel to the center axis of the crankshaft.

5. The bicycle drive unit as recited in claim 1, wherein the crankshaft is disposed near one end of the housing with respect to a longitudinal direction of the bicycle frame when the bicycle drive unit is attached to the bicycle frame and in a direction perpendicular to the crankshaft, and
the assist motor is disposed near the other end of the housing with respect to the longitudinal direction of the bicycle frame when the bicycle drive unit is attached to the bicycle frame.

6. The bicycle drive unit as recited in claim 1, wherein the housing includes two side surfaces on which are formed holes in which is disposed the crankshaft, and an outer perimeter surface which connects the two side surfaces, and
the housing further includes a plurality of attaching portions for attaching to the frame on an outer perimeter surface.

7. The bicycle drive unit as recited in claim 6, wherein half or more of the attaching portions are positioned above a portion to which is disposed the crankshaft, when the housing is attached to the bicycle frame.

8. The bicycle drive unit as recited in claim 6, wherein three of the attaching portions each includes a hole, the holes of the attaching portions have center axes so that lines connecting each of the center axes of the holes form a triangular shape, on a plane that is perpendicular to the crankshaft and that encompasses the center axis of the crankshaft.

9. The bicycle drive unit as recited in claim 1, further comprising
a transmission mechanism configured to change speed and output a rotation which is inputted to the crankshaft,
the transmission mechanism being housed inside the housing.

10. The bicycle drive unit as recited in claim 9, wherein the center axis of the crankshaft, a center axis of the assist motor, and a center axis of the transmission mechanism are disposed so that lines connecting each of the center axes form a triangular shape, on a plane that is perpendicular to the crankshaft.

11. The bicycle drive unit as recited in claim 10, wherein the triangular shape is substantially an isosceles triangle having the center axis of the assist motor as an apex.

12. The bicycle drive unit as recited in claim 10, wherein when the bicycle drive unit is attached to the frame, the center axis of the transmission mechanism is disposed below the center axis of the crankshaft, when viewed from a direction parallel to the center axis of the crankshaft.

13. The bicycle drive unit as recited in claim 9, wherein the transmission mechanism includes a planetary gear mechanism comprising an input body, an output body, and a transmission body, a one-way clutch which is disposed between the input body and the output body, and a switching mechanism which can switch between a first state which permits a rotation of the transmission body with respect to the housing and a second state which regulates the rotation of the transmission body with respect to the housing.

14. The bicycle drive unit as recited in claim 13, wherein the input body is a carrier,
the output body is a ring gear,
the transmission body is a sun gear,
the transmission mechanism further comprises a transmission shaft which is disposed on an inner perimeter of the sun gear to be integrally rotated with the sun gear and which is rotatably supported to the housing, and
the switching mechanism comprises a connecting portion which is provided to an opposing portion that opposes the transmission shaft or the housing, and a control portion configured to move the connecting portion from the protruding position to the retracted position,
the connecting portion being movably arranged between a protruding position for regulating the rotation of the transmission shaft in at least one direction forming the first state, and a retracted position which does not regulate the rotation of the transmission body forming the second state.

15. The bicycle drive unit as recited in claim 13, wherein the switching mechanism further comprises an actuator configured to switch between the first state and the second state.

16. The bicycle drive unit as recited in claim 1, further comprising
the crankshaft.

17. A bicycle comprising the bicycle drive unit as recited in claim 1, and further comprising
a rear suspension.

18. A bicycle drive unit comprising:
an assist motor configured to apply an assisting force to a manual drive force, which is inputted from a crankshaft, and
a housing at least partially disposed around the assist motor and at least a part of the crankshaft
the housing being configured so that, when the bicycle drive unit is attached to a bicycle frame, a rear end side of the housing includes a portion whose distance to a center axis of the crankshaft is constant over a prescribed range around the crankshaft, and
the distance being equal to or less than 45 mm.

* * * * *